United States Patent
Deolalikar et al.

(10) Patent No.: US 10,018,030 B2
(45) Date of Patent: Jul. 10, 2018

(54) CONDITION MONITORING OF ELECTRIC MOTOR

(71) Applicant: HALLIBURTON ENERGY SERVICES INC, Houston, TX (US)

(72) Inventors: Neelesh V. Deolalikar, Houston, TX (US); Stephen C. Janes, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/897,185

(22) PCT Filed: Dec. 30, 2014

(86) PCT No.: PCT/US2014/072819
§ 371 (c)(1),
(2) Date: Dec. 9, 2015

(87) PCT Pub. No.: WO2016/108858
PCT Pub. Date: Jul. 7, 2016

(65) Prior Publication Data
US 2017/0292363 A1    Oct. 12, 2017

(51) Int. Cl.
*E21B 7/06* (2006.01)
*E21B 44/00* (2006.01)
(Continued)

(52) U.S. Cl.
CPC .............. *E21B 44/005* (2013.01); *E21B 7/06* (2013.01); *E21B 43/128* (2013.01); *E21B 44/04* (2013.01);
(Continued)

(58) Field of Classification Search
CPC ........................................................ E21B 7/06
See application file for complete search history.

(56) References Cited

U.S. PATENT DOCUMENTS

| 5,661,386 A | 8/1997 | Kueck et al. |
| 5,812,068 A * | 9/1998 | Wisler ............... E21B 7/068 |
| | | 175/40 |

(Continued)

FOREIGN PATENT DOCUMENTS

| WO | WO 2006/065337 A1 | 6/2006 |
| WO | WO 2013/105952 A1 | 7/2013 |

OTHER PUBLICATIONS

International Search Report and Written Opinion, dated Sep. 23, 2015, 9 pages; Korean Intellectual Property Office, International Searching Authority.
(Continued)

*Primary Examiner* — Giovanna C. Wright
(74) *Attorney, Agent, or Firm* — Haynes & Boone, LLP (57) ABSTRACT

A method and system for monitoring operation of a motor may include initially determining a no load torque versus temperature characteristic of the motor over a range of operating temperatures. After a period of operation, a no load torque value and temperature of the motor may be determined. Motor temperature may be measured by a local thermistor or the like. Motor torque may be determined from measured motor current. The motor torque and temperature may then be compared to the initial torque versus temperature characteristic to determine a change in load of said motor due to break down of motor oil, worn bearings, or similar condition. In some embodiment, the method and system may be used with a downhole tool for drilling a well, such as a rotary steerable system.

10 Claims, 8 Drawing Sheets

(51) Int. Cl.
*E21B 44/04* (2006.01)
*E21B 43/12* (2006.01)
*F04D 13/10* (2006.01)
H02K 7/08 (2006.01)
H02K 5/132 (2006.01)

(52) U.S. Cl.
CPC .............. *F04D 13/10* (2013.01); *H02K 5/132* (2013.01); *H02K 7/081* (2013.01); *H02K 2213/09* (2013.01)

(56) References Cited

U.S. PATENT DOCUMENTS

| | | | |
|---|---|---|---|
| 6,092,610 | A | 7/2000 | Kosmala et al. |
| 6,206,108 | B1 | 3/2001 | MacDonald et al. |
| 6,234,259 | B1* | 5/2001 | Kuckes .................. E21B 7/062 175/61 |
| 2001/0052427 | A1* | 12/2001 | Eppink .................. E21B 4/006 175/40 |
| 2003/0034177 | A1* | 2/2003 | Chitwood ................. E21B 4/04 175/61 |
| 2009/0044938 | A1 | 2/2009 | Crossley et al. |
| 2009/0044953 | A1 | 2/2009 | Sheth et al. |
| 2009/0088294 | A1 | 4/2009 | West et al. |
| 2012/0118638 | A1 | 5/2012 | Orbell et al. |
| 2013/0058797 | A1 | 3/2013 | Prieto et al. |
| 2014/0060935 | A1 | 3/2014 | Winslow et al. |
| 2015/0110642 | A1* | 4/2015 | Dahouk ................ F04D 13/068 417/16 |

OTHER PUBLICATIONS

Extended Examination Report issued for EP Patent Application No. 14909660.4, dated Apr. 6, 2018.

\* cited by examiner

CONDITION MONITORING OF ELECTRIC MOTOR

CROSS REFERENCE TO RELATED APPLICATIONS

The present application is a U.S. National Stage patent application of International Patent Application No. PCT/US2014/072819, filed on 30 Dec. 2014, the benefit of which is claimed and the disclosure of which is incorporated herein by reference in its entirety.

TECHNICAL FIELD

The present disclosure relates generally to monitoring of electric motors, and in particular to monitoring of electric motors in downhole tools used for drilling, completing, servicing, and evaluating wellbores in the earth.

BACKGROUND

Motors are used in downhole tools for a variety of reasons. Electric motors may be placed in a compensated oil bath environment. Sometimes, the motors have an inbuilt thermistor or temperature sensor other to track the motor temperature and thus its performance. Other times a thermistor can be placed close to the motor to monitor the motor temperature.

BRIEF DESCRIPTION OF THE DRAWINGS

Embodiments are described in detail hereinafter with reference to the accompanying figures, in which.

DETAILED DESCRIPTION

The present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper," "uphole," "downhole," "upstream," "downstream," and the like, may be used herein for ease of description to describe one element or feature's relationship to another element(s) or feature(s) as illustrated in the figures. The spatially relative terms are intended to encompass different orientations of the apparatus in use or operation in addition to the orientation depicted in the figures.

Figure 1:
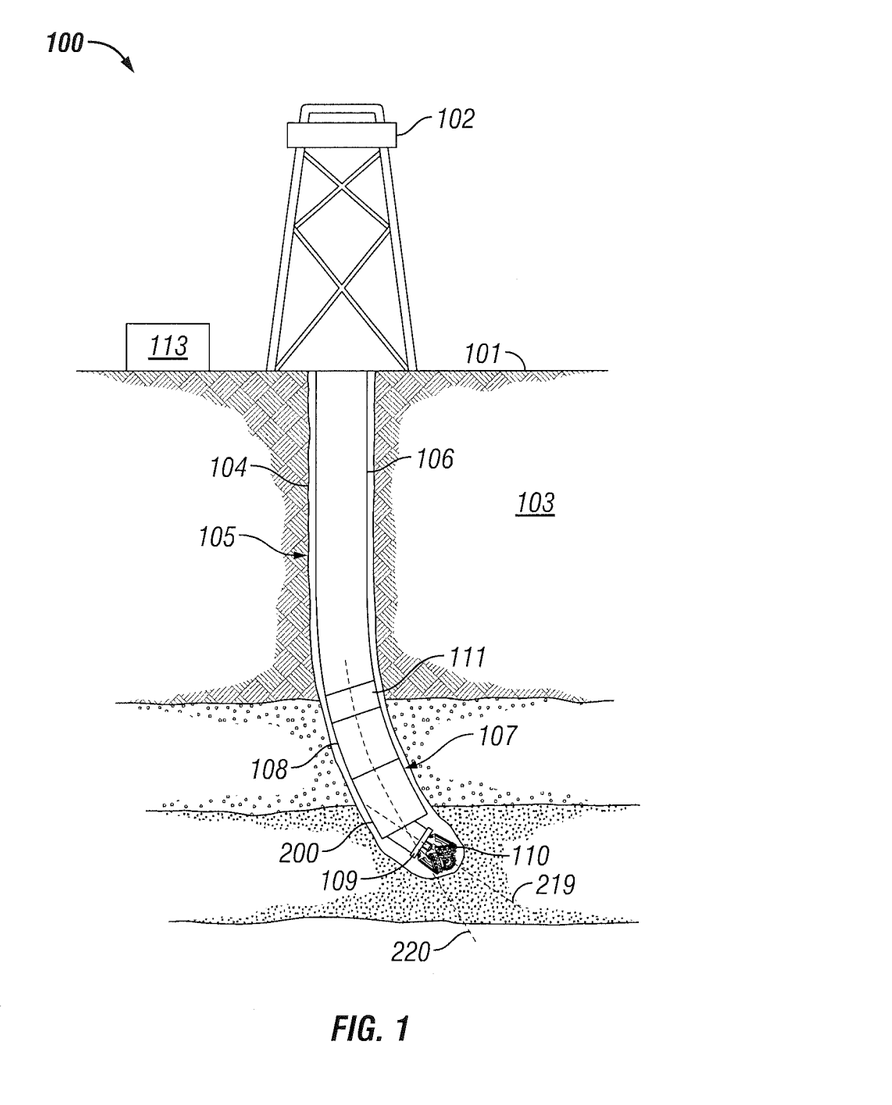
FIG. 1 is an elevation view in partial cross section of a well with a rotary steerable drilling system according to an embodiment.

FIG. 1 is a diagram illustrating an exemplary drilling system 100, according to aspects of the present disclosure. Drilling system 100 includes rig 102 mounted at surface 101 and positioned above borehole 104 within a subterranean formation 103. In the embodiment shown, a drilling assembly 105 may be positioned within borehole 104 and may be coupled to rig 102. Drilling assembly 105 may include drill string 106 and bottom hole assembly (BHA) 107. Drill string 106 may include a plurality of segments threadably connected. BHA 107 may include a drill bit 109, a measurement-while-drilling (MWD) apparatus 108 and a steering assembly 200. Steering assembly 200 may control the direction in which borehole 104 is being drilled. Borehole 104 may be drilled in the direction perpendicular to tool face 110 of drill bit 109, which corresponds to longitudinal axis 219 of drill bit 109. Accordingly, controlling the direction of borehole 104 may include controlling the angle between longitudinal axis 219 of drill bit 109 and longitudinal axis 220 of steering assembly 200, and controlling the angular orientation of drill bit 109 relative to formation 103.

Steering assembly 200 may include an offset mandrel (not shown) that causes longitudinal axis 219 of drill bit 109 to deviate from longitudinal axis 220 of steering assembly 200. The offset mandrel may be counter-rotated relative to the rotation of drill string 106 to maintain an angular orientation of drill bit 109 relative to formation 103. Steering assembly 200 may receive control signals from a control unit 113. Control unit 113 may include an information handling system with a processor and a memory device, and may communicate with steering assembly 200 via a telemetry system 111. In certain embodiments, control unit 113 may transmit control signals to steering assembly 200 to alter longitudinal axis 220 of drill bit 109 as well as to control counter-rotation of portions of the offset mandrel to maintain the angular orientation of drill bit 109 relative to formation 103. In certain embodiments, a processor and memory device may be located within steering assembly 200 to perform some or all of the control functions. Moreover, other BHA 107 components, including MWD apparatus 108, may communicate with and receive instructions from control unit 113.

Figure 2A:
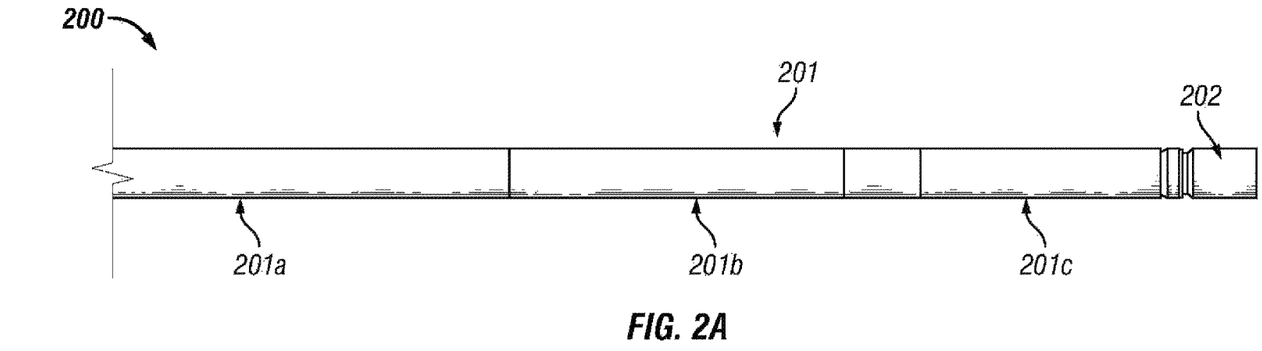
FIG. 2A is an elevation view of a steering assembly of the rotary steerable drilling system of FIG. 1 according to an embodiment, showing a control mechanism, a drive mechanism, a steering mechanism, and a bit shaft.
Figure 2B:
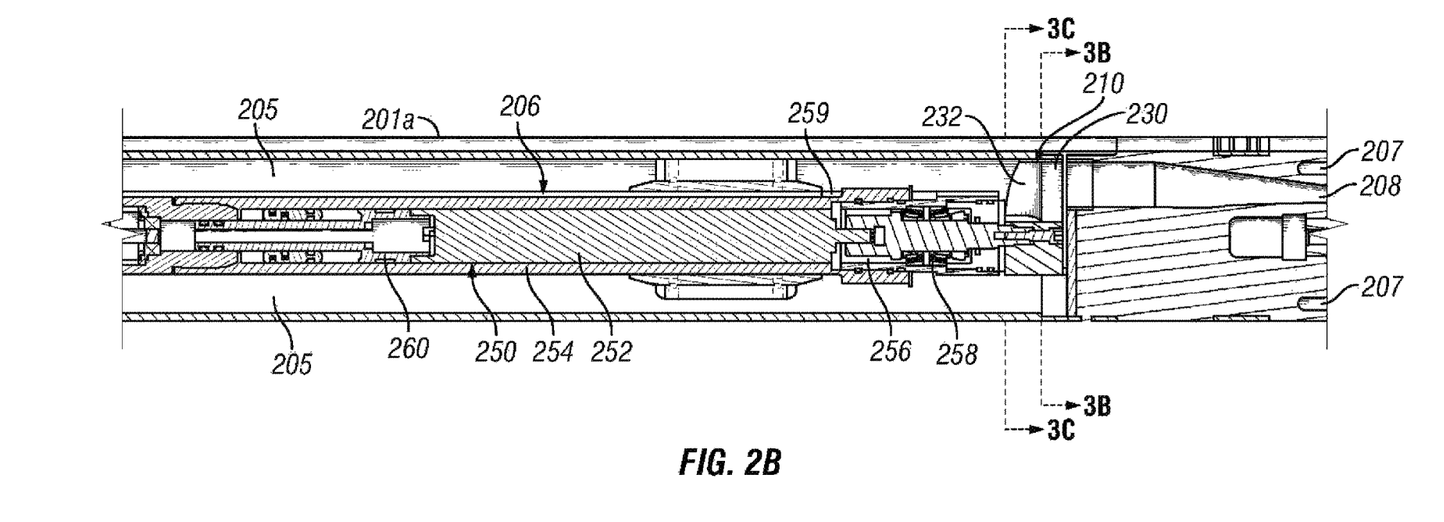
FIG. 2B is an axial cross section of the control mechanism of the steering assembly of FIG. 2A, showing a flow control valve that controls drilling fluid flow rate to the drive element of the drive mechanism of FIG. 2C.
Figure 2C:
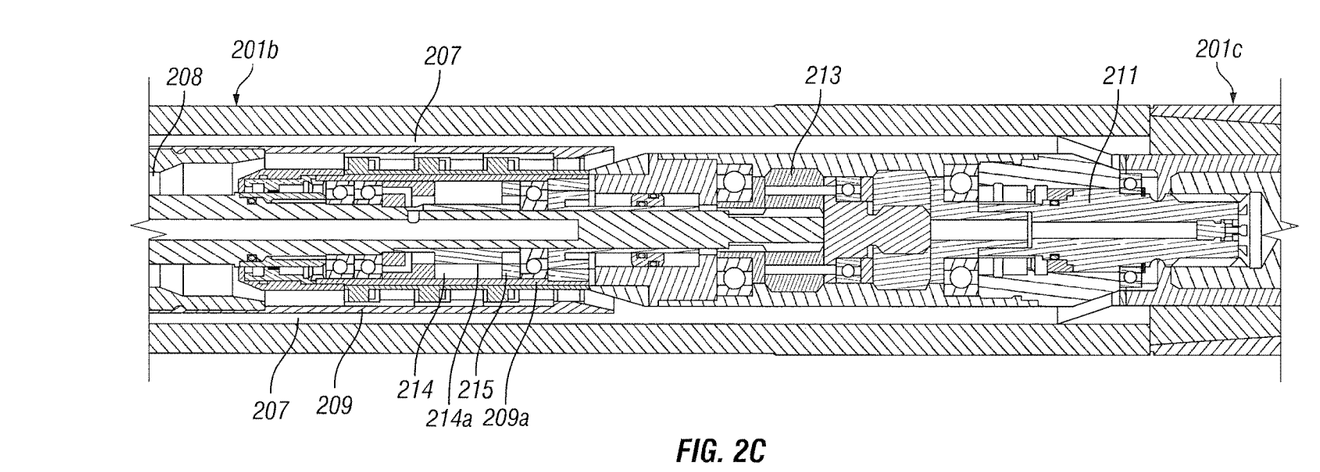
FIG. 2C is an axial cross section of the drive mechanism of the steering assembly of FIG. 2A, showing a fluid-powered drive element.
Figure 2D:
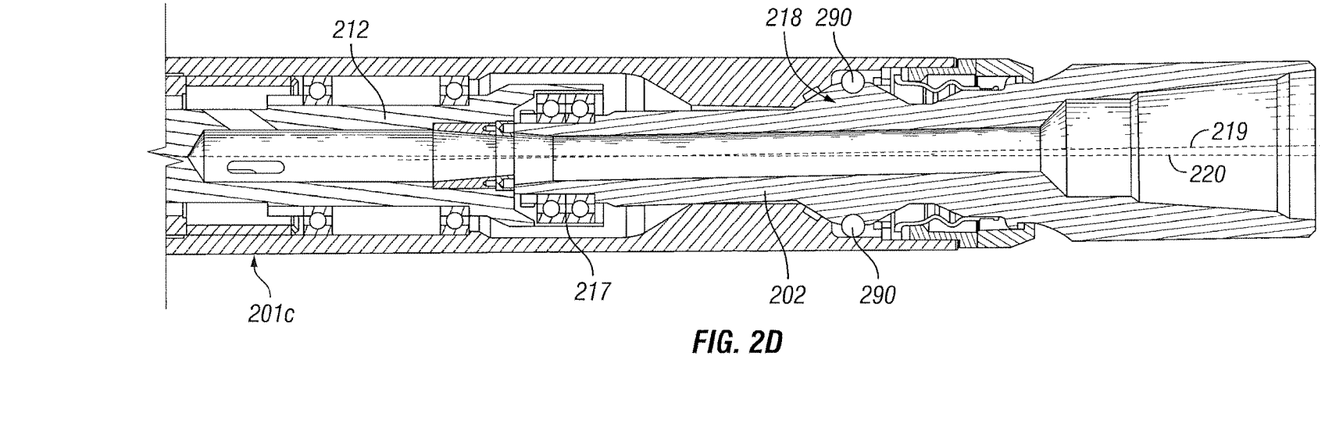
FIG. 2D is an axial cross section of the steering mechanism of the steering assembly of FIG. 2A, showing an offset mandrel counter-rotated by the drive element of FIG. 2C for maintaining an angular orientation of the bit shaft of FIG. 2A as the steering assembly is rotated.

FIGS. 2A-D are diagrams illustrating an exemplar steering assembly 200, according to aspects of the present disclosure, that may be used, in part, to maintain a drill bit in a geo-stationary position during drilling operations. FIGS. 2B-D depict illustrative portions of steering assembly 200. Steering assembly 200 may include a housing 201 that may be coupled directly to a drill string or indirectly to a drill string, such as through a MWD apparatus. Housing 201 may include separate segments 201 *a-c*, or may include a single unitary housing. In certain embodiments, each of the segments may correspond to a separate instrument portion of steering assembly 200. For example, section 201*a* may house the control mechanisms, and may communicate with a control unit at the surface and/or receive control signals from the surface and control mechanisms within the steering assembly. In certain embodiments, the control mechanisms may include a processor and a memory device, and may receive measurements from position sensors within the steering assembly, such as gravity tool face sensors that may indicate a drilling direction. The control mechanism may also receive measurements form temperature sensors and current sensors. Section 201*b* may include drive elements, including a variable flow pathway and a flow-controlled drive mechanism. Section 201*c* may include steering elements that control the drilling angle and axial orientation of a drill bit coupled to bit shaft 202 of steering assembly 200.

Referring to FIGS. 2B and 2C, in certain embodiments, steering assembly 200 may be coupled, directly or indirectly, to drill string 106 (FIG. 1), through which drilling fluid may be pumped during drilling operations. The drilling fluid may flow into an annulus 205 around a flow control module 206. The drilling fluid may then either flow to an inner annulus 208, in fluid communication with a fluid-powered drive element 209, or may be diverted to a bypass annulus 207. The rotational speed of fluid-powered drive element 209 may be controlled by the amount and rate of drilling fluid that flows into inner annulus 208. Accordingly, a flow control valve 210 may be included within flow control module 206 and may selectively control the proportion of drilling fluid that enters inner annulus 208 to drive fluid-powered drive element 209 to the portion of flow that is bypassed.

According to aspects of the present disclosure, in certain embodiments, flow control valve 210, therefore, may be used to control the rotational speed of fluid-powered drive element 209 by varying the amount or rate of drilling fluid that flows into inner annulus 208. However, other variable flow fluid pathways may be provided using a variety of valve configurations that may meter the flow of drilling fluid across a fluid-powered drive mechanism.

FIG. 2C illustrates a fluid-powered drive element 209 in fluid communication with inner annulus 208. In the embodiment shown, fluid-powered drive element 209 may include a turbine, but other fluid-powered drive mechanisms may be possible, including but not limited to a mud motor. Turbine 209 may include a plurality of rotors and stators that generate rotational movement in response to fluid flow within inner annulus 208. Turbine 209 may generate rotation at an output shaft 211, which may be coupled, directly or indirectly, to an offset mandrel 212 (FIG. 2D). In the embodiment shown, a speed reducer 213 may be placed between turbine 209 and output shaft 211 to reduce the rate of rotation generated by turbine 209.

In certain embodiments, a generator 214 may be coupled to fluid-powered drive element 209. Generator 214 may be magnetically coupled to a rotor 209*a* of turbine 209. Generator 214 may include a wired stator 214*a*. Wired stator 214*a* may be magnetically coupled to a rotor 209*a* of rotor 209 via magnets 215 coupled to rotor 209*a*. As turbine 209 rotates, so does rotor 209*a*, which may cause magnets 215 to rotate around wired stator 214*a* thereby generating an electrical potential within which may be used to power a variety of control mechanisms and sensors located within steering assembly 200, including control mechanisms within segment 201*a*.

Referring to FIGS. 2C and 2D, output shaft 211 may be coupled, directly or indirectly, to an offset mandrel 212. Output shaft 211 may impart rotation from turbine 209 to offset mandrel 212, so that offset mandrel 212 may be rotated independently from housing 201. Offset mandrel 212 may be coupled to output shaft 211 at a first end and may include an eccentric receptacle 217 at a second end. Bit shaft 202 may be at least partially disposed within eccentric receptacle 217. Eccentric receptacle 217 may be used to alter or maintain a longitudinal axis 219 of bit shaft 202 and a drill bit (not shown) coupled to bit shaft 202. Bit shaft 202 may be pivotally coupled to housing 201 at pivot point 218. Bit shaft 202 may pivot about pivot point 218 to alter a longitudinal axis 219 of bit shaft 202. In certain embodiments, eccentric receptacle 217 may cause bit shaft 202 to pivot about pivot point 218, which may offset longitudinal axis 219 of bit shaft 202 relative to longitudinal axis 220 of steering assembly 200. In addition to allowing bit shaft 202 to pivot relative to housing 201, pivot point 218 may also be used to impart torque from housing 201 to bit shaft 202. The torque may be imparted to a drill bit 109 (FIG. 1) that is coupled to bit shaft 202 and that may share longitudinal axis 219 of bit shaft 202. Longitudinal axis 219 of bit shaft 202 may therefore correspond to a drilling angle of steering assembly 200.

During drilling operations, a drill string coupled to housing 201 may be rotated, causing housing 201 to rotate around longitudinal axis 220. The rotation of housing 201 may be imparted to bit shaft 202 as torque through pivot point 218 using balls 290. The torque may cause bit shaft 202 to rotate about its longitudinal axis 219 as well as longitudinal axis 220 of steering assembly 200. When longitudinal axis 219 of bit shaft 202 is offset relative to longitudinal axis 220 of steering assembly 200, this may cause the end of bit shaft 202 to rotate with respect to longitudinal axis 220, changing the angular direction of bit shaft 202 and corresponding bit with respect to the surrounding formation.

In certain embodiments, offset mandrel 212 may be counter-rotated relative to housing 201 to maintain the angular orientation of bit shaft 202. For example, a drill string may be rotated in a first direction at a first speed, causing steering assembly 200 to rotate at the first direction and the first speed. To maintain the angular orientation of bit shaft 202 with respect to the surrounding formation, flow control valve 210 (FIG. 2B) may be actuated to provide a desired flow rate of drilling fluid across fluid-powered drive element 209 so that offset mandrel 212 is rotated in a second direction, opposite the first direction, at a second speed, the same as the first speed. Notably, with offset mandrel 212 rotating opposite housing 201 at the same speed, eccentric end 217 of offset mandrel 212 may remain stationary with respect to the surrounding formation (geo-stationary), maintaining the angular orientation of hit shaft 202 relative to the formation while still allowing bit shaft 202 to rotate about its longitudinal axis 219. Likewise, the angular orientation of bit shaft 202 may be altered relative to the surrounding formation by rotating offset mandrel 212 at any other speed than the rotational speed of housing 201.

Referring to FIGS. 2B, and 3A-3C, housing section 201*a* may house the control mechanisms, and may communicate with a control unit at the surface and/or receive control signals from the surface and control mechanisms within the steering assembly. The drilling fluid may flow from drill string 106 (FIG. 2) into annulus 205 defined around flow control module 206. The drilling fluid may then either flow to an inner annulus 208, in fluid communication with a fluid-powered drive element 209, or may be diverted to a bypass annulus 207. Flow control module 206 may include a flow control valve 210 having a rotor flow plate 232 that may be rotated and selectively positioned with respect a stator flow plate 230.

Figure 3A:
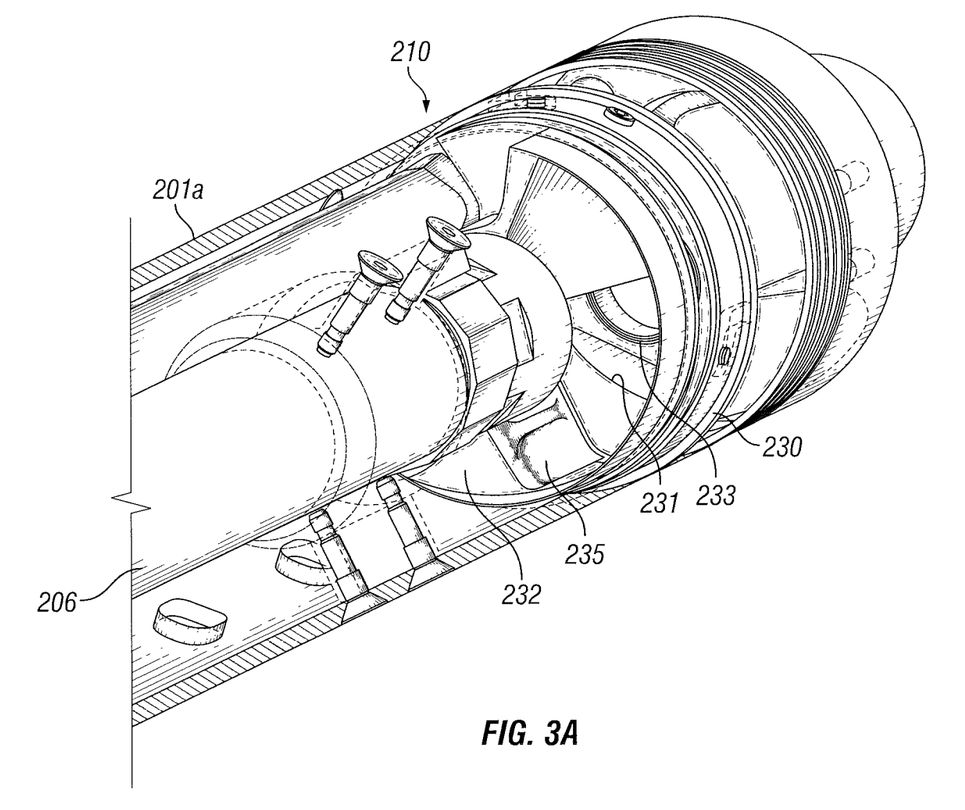
FIG. 3A is a perspective view of the flow control valve of FIG. 2B, shown with a portion of the housing cut away to reveal rotor and stator flow control plates.
Figure 3B:
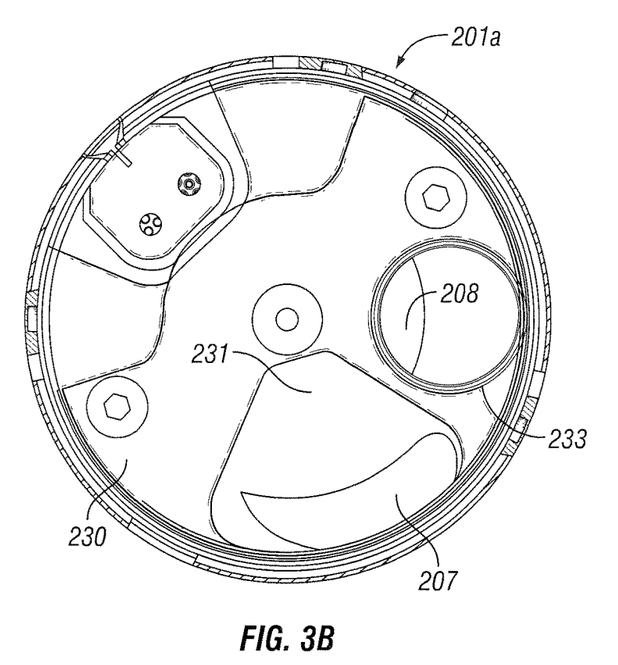
FIG. 3B is a transverse cross section taken along line 3B-3B of FIG. 2B, showing the stator flow control plate of FIG. 3A with inner annulus and bypass annulus flow ports.
Figure 3C:
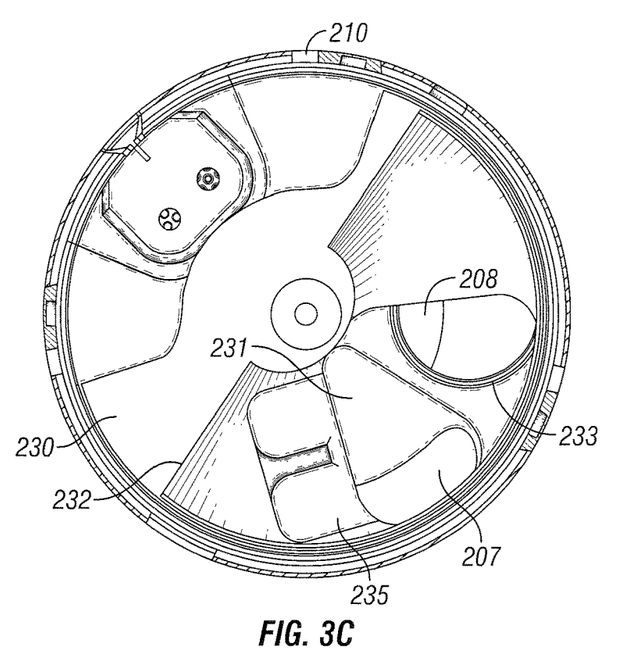
FIG. 3C is a transverse cross section taken along line 3C-3C of FIG. 2B, showing the rotor flow control plate of FIG. 3A for creating a variable flow fluid pathway.

Stator flow plate 230 includes a bypass port 231 that is in fluid commination with bypass annulus 207 and an operating port 233 that is in fluid communication with internal annulus 208. Rotor flow plate 232 rotates with respect to stator flow plate 230. Rotor flow plate has a singular port formed therethrough that can be selectively positioned to provide total flow to bypass annulus 107, total flow to internal annulus 208, or to split in varying proportions between the two flow paths. Rotor flow plate may include a ramp surface to facilitate flow.

Referring back to FIG. 2B, the position of rotor flow plate 232 with respect to stator flow plate 230 may be determined by flow control module 206. In an embodiment, flow control module 206 includes an electric motor 250 located within a pressure compensated oil bath. Motor 250 may include a rotor 252, a stator 254 and output shaft 256, bearing assemblies 258, and a pressure compensating piston 260. A thermistor, thermocouple, or other temperature sensor 259 may be located within motor 250, within the oil bath, or on a surface of electric motor 250. Output shaft 256 is connected to rotor flow plate 232 of flow control valve 210.

In the embodiment illustrated, electric motor 250 operates as servo motor, stepper motor, or the like, adjusting and maintaining a desired rotational position of rotor flow plate 232 within a limited rotational window. However, other types of motors and arrangements may be used as appropriate.

Figure 4:
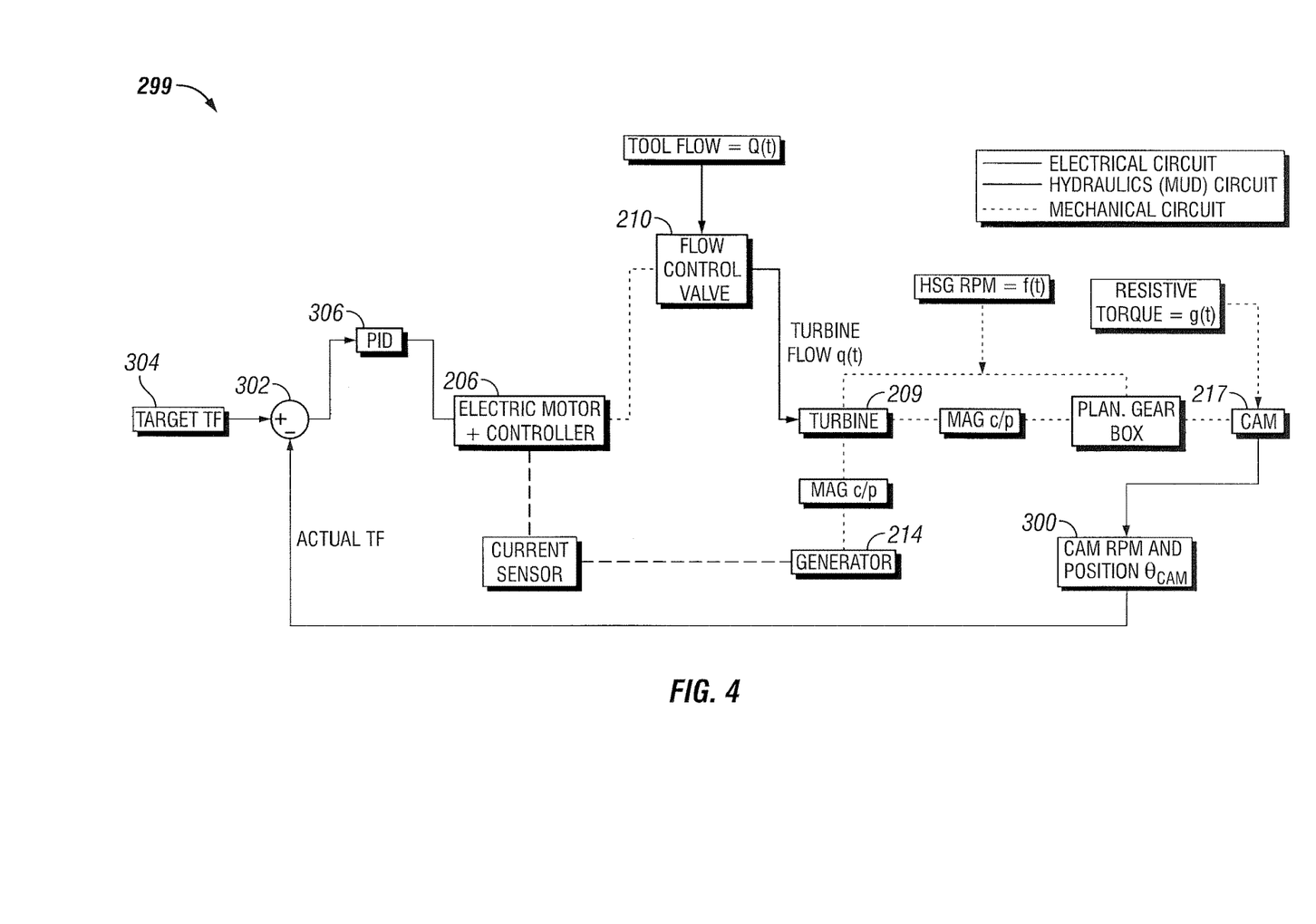
FIG. 4 is a block level schematic of a control system of the steering assembly of FIG. 2A.
Figure 5:
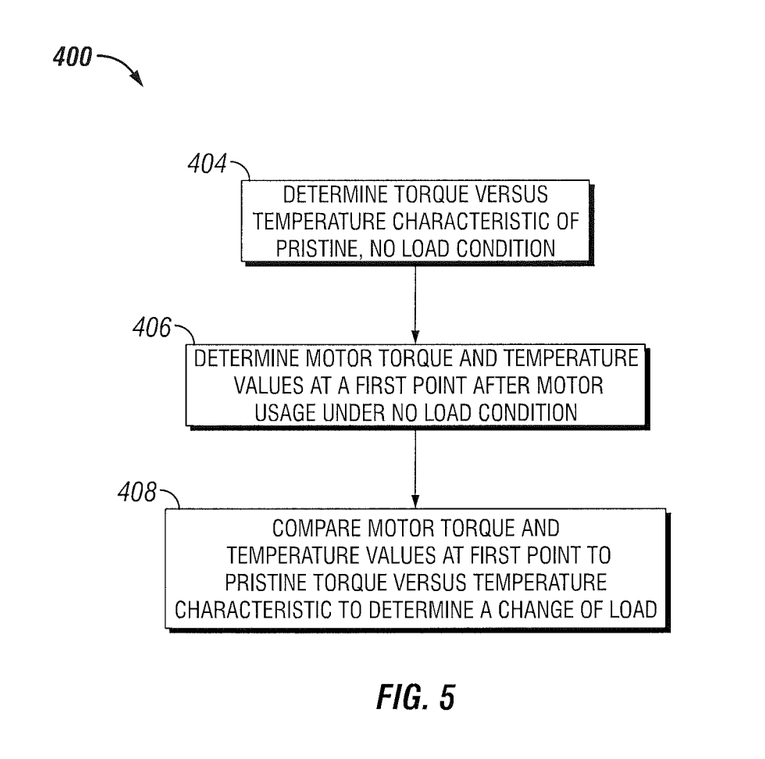
FIG. 5 is a flow chart of a method for monitoring the condition of an electric motor according to an embodiment.

FIG. 4 is a block level schematic of an overall control system 299 of steering assembly 200. FIG. 5 illustrates a method for using a thermistor and electric motor 250 to monitor the condition of the oil and other components of steering assembly 200. Although described in the context of a downhole steering assembly, the system and method of the present disclosure may be used to monitor conditions of any suitable electric motor.

Referring to FIGS. 2B and 4, electric motor 250 may be used to selectively actuate and maintain position of flow control valve 210. Electric motor 250 may be disposed in a compensated oil bath environment along with bearings 258 that carry the load imposed by shear valve 350. In particular, a selective portion of total drilling fluid flow may be ported to fluid-powered drive 209 by flow control valve 210 to control the speed thereof, and the speed of the cam. 217 which controls the tool face. Cam speed and position may be measured at sensor 300 and is provided as negative feedback to a summer unit 302 along with the target tool face value. The output of summer 302 is input to a proportional-integral-derivative controller 306, which in turns actuates or varies electric motor 350 to reposition flow control valve 210 appropriately.

FIG. 5 is a flow chart that outlines a method 400, for controlling and assessing the operating condition of motor according to one or more embodiments. Although described with respect to the presently disclosed embodiment, this method is not limited to such. Indeed, in any circumstance where is may be desirable to determine the health of a motor that is remotely located, such as a downhole motor, the following method may be appropriate.

At step 404, a torque versus temperature characteristic of the motor over a range of operating temperatures during a first period of time is determined. This torque versus temperature characteristic may be used as a benchmark for future assessment of motor condition. Accordingly, it may be preferable to establish the torque versus temperature characteristic under pristine conditions, with fresh clean oil and new bearings, for example. Torque versus temperature characteristic may be determined in a lab environment, for example, by measuring torques and the motor is heater through a range of operating temperature.

For an electric motor, torque may be determined by measuring motor current draw. One way of doing this is to actuate the motor and measure the drag torque by measuring the current. Motor torque is given by:

$$T = kti \qquad \text{Eq. 1}$$

where T is torque, kt is the torque constant of the motor, and i is the current. Because the oil bath viscosity varies with temperature, it is necessary know the temperature at which the torque is measured. The temperature may be measured using a thermistor or any other temperature measuring device.

At step 406, the motor may be located at a point downhole and been used for a period of time. Motor torque and motor temperature are determined, again under no load conditions. As above, motor torque may be determined from motor current using Equation 1. In the absence of any drilling fluid flow, when the motor is actuated, then the motor has to overcome only the viscous friction of the oil and the nominal bearing friction, because there is no operational load.

At step 408, by comparing the motor torque and temperature value to the pristine torque versus temperature characteristic, the condition of the motor setup, especially changes in viscosity of the oil or bearing condition, may be determined. Thus by knowing the temperature and drag torque at the start of operation and after a given number of operating hours, the operator can make an informed decision about the condition of the oil and bearings and the motor setup in general.

Figure 6:
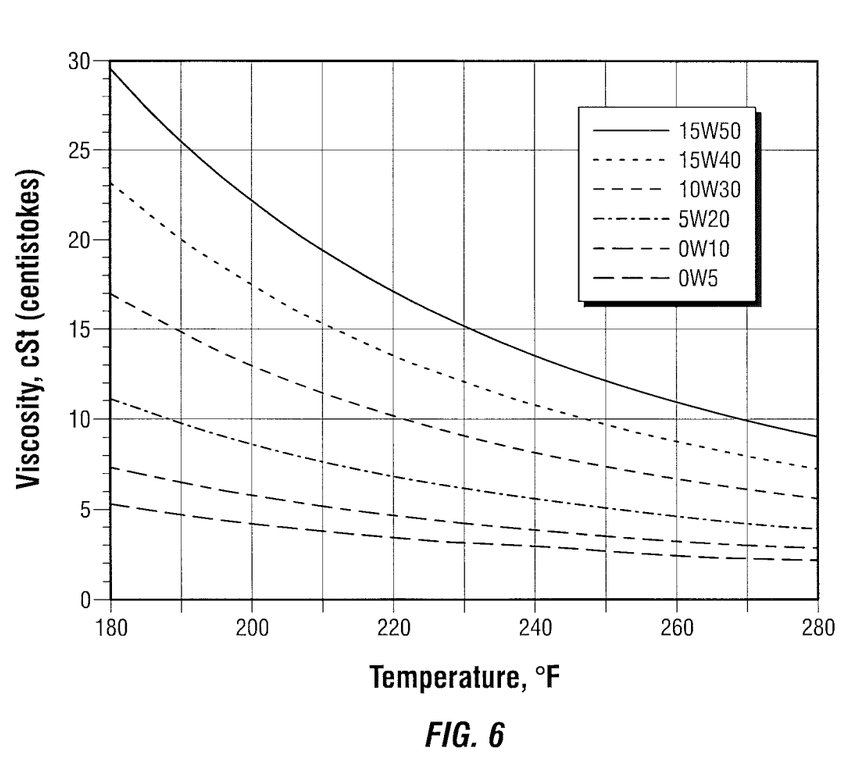
FIG. 6 is an exemplary plot of oil viscosity versus temperature.

FIG. 6 is an exemplary oil viscosity verses temperature plot that may allow an operator to assess a nominal viscosity value at a temperature and thereby able to changes in oil viscosity based on motor operating characteristics that affect no load torque values.

This method may allow the establishment of a condition monitoring system without the requirement for any additional sensors apart from those that are likely being used in the tool. At the same time, optimal maintenance procedures can be established to change the oil and/or bearings of electric motor 350 based on operational data.

In summary, a system and method for drilling a wellbore and a method for monitoring operation of a motor have been described. Embodiments of the system for drilling a wellbore may generally have: A steering assembly having a housing and steerable bit shaft, a tool face of the bit shaft controllable by an electric motor disposed within the steering assembly; a drill bit coupled to the bit shaft; a drill string operable to rotate the housing of the steering assembly in a first direction; a temperature sensor coupled to the electric motor; a telemetry system coupled to the temperature sensor; and a surface control unit in communication with the telemetry system, the control unit operable to receive temperature data from the temperature sensor via the telemetry system and to receive motor current data of the electric motor and determine a change in operating condition of the electric motor by comparison with a torque versus temperature characteristic of the motor under pristine no load conditions. Embodiments of the method for drilling a wellbore may generally include: Providing a steering assembly having steerable bit shaft, a tool face of the bit shaft controllable by a motor disposed within the steering assembly; determining a torque versus temperature characteristic of the motor over a range of operating temperatures under a pristine no load condition; coupling a drill bit to the bit shaft; coupling the steering assembly along a drill string; rotating the drill string in a first direction to rotate a housing of the steering assembly and the drill bit to drill the wellbore to a first depth while at least occasionally operating the motor to control the tool face; determining a first torque value of the motor under a no load condition at the first depth; determining a first temperature value of the motor at the first depth; and comparing the first torque and temperature values to the torque versus temperature characteristic to determine a change in load of the motor. Embodiments of the method for drilling a wellbore may generally include: Determining a torque versus temperature characteristic of the motor over a range of operating temperatures during a first period of time; determining a first torque value of the motor at a first point in time after the first period of time; determining a first temperature value of the motor at the first point in time; and comparing the first torque and temperature values to the torque versus temperature characteristic to determine a change in load of the motor.

Any of the foregoing embodiments may include any one of the following elements or characteristics, alone or in combination with each other: An electric current sensor coupled to the electric motor and to the surface control unit; an electric generator disposed within the steering assembly and electrically coupled to the electric motor for powering the electric motor; the electric current sensor coupled the surface control unit via the telemetry system; a drive mechanism disposed within the steering unit and selectively fluidly coupled to the drill string, the electric generator coupled to the drive mechanism; a flow control valve fluidly coupled between the drill string and the drive mechanism, the electric motor coupled to the flow control valve for positioning the flow control valve; an offset mandrel coupled between the drive mechanism and the bit shaft for controlling a tool face of the drill bit; rotating by a drive mechanism an offset mandrel with respect to the housing in a second direction opposite the first direction to control the tool face; controlling the speed of the drive mechanism by the motor; powering the drive mechanism with a fluid flow; controlling the fluid flow to the drive mechanism by a flow control valve; positioning the flow control valve by the motor; the motor is an electric motor; the method further comprises measuring a motor current to determine motor torque; measuring the first temperature value by a temperature sensor coupled to the electric motor; telemetering the first temperature value to a control unit located at the surface of the wellbore; rotating a generator by the drive mechanism; providing the motor current by the generator; measuring a first motor current value at the first depth; telemetering the first motor current value to the control unit; operating the motor in an oil bath environment; determining a pristine oil viscosity value at the first temperature value; determining a first oil viscosity value at the first temperature for the first depth on the change in load of the motor; determining the torque versus temperature characteristic under a no load operating condition; determining the first torque and temperature values under the no load operating condition; the change in load relates to an efficiency of the motor; determining the torque versus temperature characteristic under a pristine motor condition; determining the first torque and temperature values under a used motor condition; the motor is an electric motor; measuring a motor current to determine motor torque; operating the motor in an oil bath environment; determining a pristine oil viscosity value at the first temperature value; determining a first oil viscosity value at the first temperature for the first point in time based on the change in load of the motor.

The abstract of the disclosure is solely for providing the reader a way to determine quickly from a cursory reading the nature and gist of technical disclosure, and it represents solely one or more embodiments.

While various embodiments have been illustrated in detail, the disclosure is not limited to the embodiments shown. Modifications and adaptations of the above embodiments may occur to those skilled in the art. Such modifications and adaptations are in the spirit and scope of the disclosure.

What is claimed:

1. A method for drilling a wellbore, comprising:
providing a steering assembly having steerable bit shaft, a tool face of said bit shaft controllable by a motor disposed within said steering assembly;
determining a torque versus temperature characteristic of said motor over a range of operating temperatures under a pristine no load condition;
coupling a drill bit to said bit shaft;
coupling said steering assembly along a drill string;
rotating said drill string in a first direction to rotate a housing of said steering assembly and said drill bit to drill said wellbore to a first depth while at least occasionally operating said motor to control said tool face;
determining a first torque value of said motor under a no load condition at said first depth;
determining a first temperature value of said motor at said first depth; and
comparing said first torque and temperature values to said torque versus temperature characteristic to determine a change in load of said motor.

2. The method of claim 1 further comprising:
rotating by a drive mechanism an offset mandrel with respect to said housing in a second direction opposite said first direction to control said tool face; and
controlling the speed of said drive mechanism by said motor.

3. The method of claim 2 further comprising:
powering said drive mechanism with a fluid flow;
controlling said fluid flow to said drive mechanism by a flow control valve; and
positioning said flow control valve by said motor.

4. The method of claim 3 wherein:
said motor is an electric motor; and
the method further comprises measuring a motor current to determine motor torque.

5. The method of claim 4 further comprising:
measuring said first temperature value by a temperature sensor coupled to said electric motor; and
telemetering said first temperature value to a control unit located at the surface of said wellbore.

6. The method of claim 5 further comprising:
rotating a generator by said drive mechanism;
providing said motor current by said generator;
measuring a first motor current value at said first depth; and
telemetering said first motor current value to said control unit.

7. The method of claim 1 further comprising:
operating said motor in an oil bath environment;
determining a pristine oil viscosity value at said first temperature value; and determining a first oil viscosity value at said first temperature for said first depth on said change in load of said motor.

8. A system for drilling a wellbore, comprising:
a steering assembly having a housing and steerable bit shaft, a tool face of said bit shaft controllable by an electric motor disposed within said steering assembly;
a drill bit coupled to said bit shaft;
a drill string operable to rotate said housing of said steering assembly in a first direction;
a temperature sensor coupled to said electric motor;
a telemetry system coupled to said temperature sensor;
a surface control unit in communication with said telemetry system, said control unit operable to receive temperature data from said temperature sensor via said telemetry system and to receive motor current data of said electric motor and determine a change in operating condition of said electric motor by determining a calculated torque from said motor current data, and by comparison of said calculated torque and said temperature data with a torque versus temperature characteristic of said motor under pristine no load conditions;
a drive mechanism disposed within said steering assembly and selectively fluidly coupled to said drill string; and
a flow control valve fluidly coupled between said drill string and said drive mechanism, said electric motor coupled to said flow control valve for positioning said flow control valve; and
an offset mandrel coupled between said drive mechanism and said bit shaft for controlling a tool face of said drill bit.

9. The system of claim 8 further comprising:
an electric current sensor coupled to said electric motor and to said surface control unit.

10. The system of claim 9 further comprising:
an electric generator disposed within said steering assembly and electrically coupled to said electric motor for powering said electric motor;
said electric current sensor coupled said surface control unit via said telemetry system.

* * * * *